Nov. 12, 1968  A. E. HARTMAN  3,411,078
APPARATUS INCLUDING PLURAL DETECTORS FOR DETECTING FAULTS
IN ELECTRICALLY NONCONDUCTING MATERIAL
Filed July 6, 1966  2 Sheets-Sheet 1

INVENTOR
A.E. HARTMAN
BY
ATTORNEY

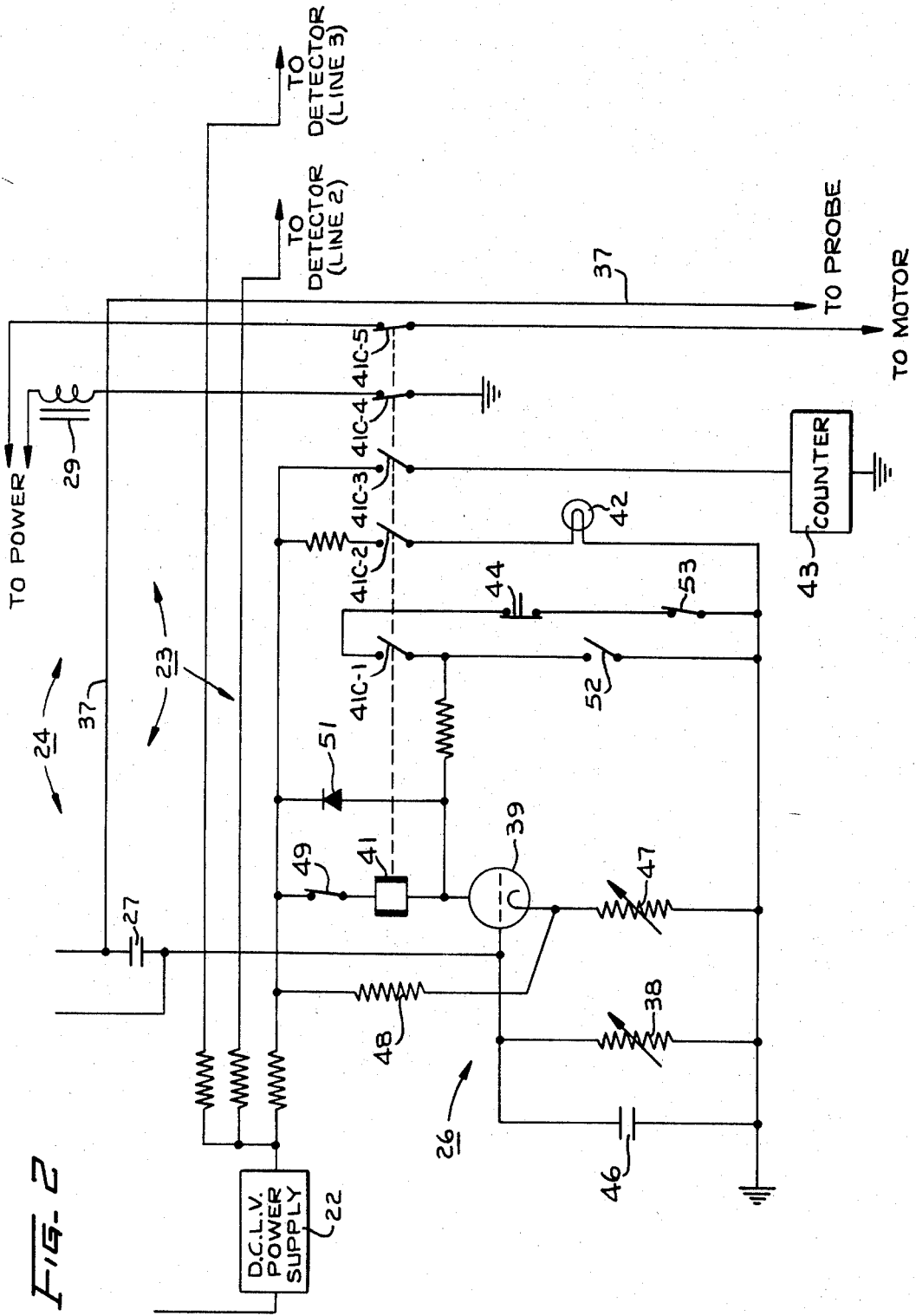

United States Patent Office 3,411,078
Patented Nov. 12, 1968

3,411,078
APPARATUS INCLUDING PLURAL DETECTORS FOR DETECTING FAULTS IN ELECTRICALLY NONCONDUCTING MATERIAL
Alfred E. Hartman, Ralston, Nebr., assignor to Western Electric Company, Incorporated, New York, N.Y., a corporation of New York
Filed July 6, 1966, Ser. No. 563,127
10 Claims. (Cl. 324—54)

ABSTRACT OF THE DISCLOSURE

Apparatus for detecting faults in the insulation of at least two electrical conductor wires includes a high voltage source, a fault detector for each of the insulated wires and a capacitor for energizing each fault detector. A fault in the insulation on one of the wires completes a discharge path for both capacitors through the fault, whereby the capacitor associated with the wire discharges to operate its fault detector. The discharge path of the other capacitor, however, is such that its discharge time constant is longer than that of the first capacitor, and before the second capacitor can discharge its discharge path is opened by a device responsive to the energized fault detector, to preclude the second capacitor from discharging to operate its fault detector.

Figure 1:
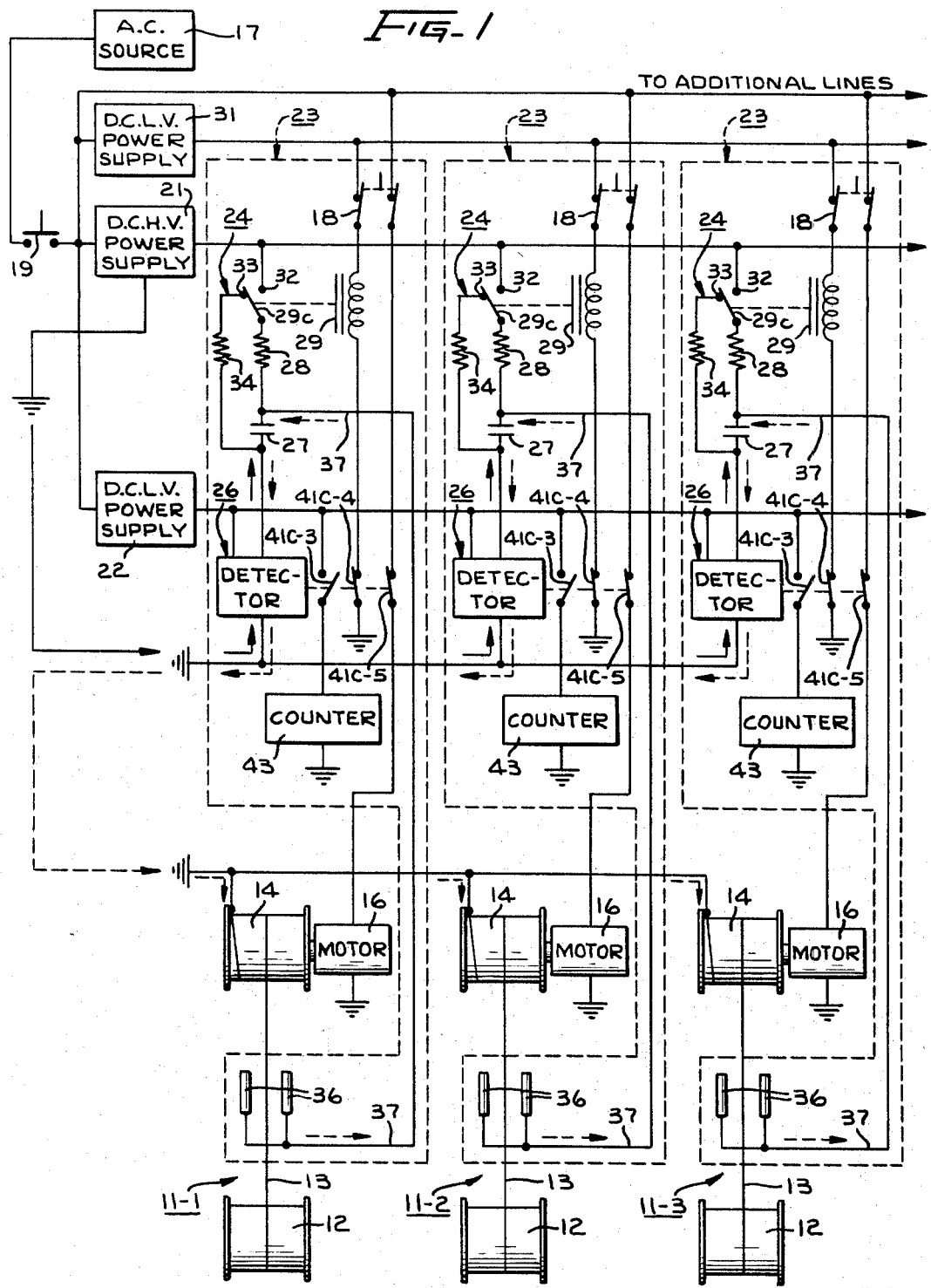

This invention relates to fault detecting apparatus, and more particularly to apparatus for detecting faults in electrically nonconducting material.

In the manufacture of insulated electrical conductor wire to be used in making communication cable, it is standard practice to pass the wire longitudinally through an extruding apparatus which extrudes insulation onto the wire. Subsequently, the insulated wire is wound on reels by a takeup mechanism.

Occasionally, the finished insulation on the wire includes a plurality of defective portions or faults, as for example, air voids and bubbles which are produced during the extrusion process, or cracks or splits which are caused as the insulated wire proceeds along the insulating line. These faults or defective portions are undesirable because they decrease the dielectric strength and the structural strength of the insulation, and thus have a similar adverse effect upon a cable into which the insulated wire is incorporated The fact that these faults exist is taken into consideration by testing the insulation for high voltage strength. This test involves counting the faults by subjecting the insulation on the wire to a high electrical stress as the wire proceeds along the insulating line, so that when a fault in the insulation is present ionization of the gas in the fault occurs to produce an electrical discharge which operates a counting device. When the faults exist in excess of a predetermined number and frequency, the reel on which the wire has been wound is marked by the line operator and the wire is scrapped or repaired in a subsequent semi-automatic process, since it is not suitable for communication purposes.

Subsequently, two of the insulated wires are twisted into a wire pair prior to the wires being incorporated into a communication cable. During this twisting operation the insulation on the wires in the wire pair is again tested for high voltage strength and when the faults in the insulation exist in excess of a predetermined number and frequency the reel on which the wire pair has been wound is marked by the machine operator and the wire pair is scrapped or repaired in a subsequent semi-automatic process.

In the semi-automatic repair process, the insulated wire or insulated wire pair, as the case may be, is advanced from a supply reel and wound upon a takeup reel by a suitable takeup mechanism. The faults in the insulation are located by subjecting the insulation to a high electrical stress such that when a fault in the insulation is present a detecting circuit is energized to stop the apparatus. The fault in the insulation then is repaired in a suitable manner, after which the apparatus is reactuated.

Heretofore, apparatus for locating faults in the insulation on a wire repair line has been substantially independent of apparatus associated with another wire repair line. Similarly, apparatus for detecting and counting faults in the insulation on a wire insulating line or a wire pair twisting machine has been substantially independent of apparatus for counting and detecting faults on another wire insulating line or wire pair twisting machine.

In general, this arrangement is undesirable from a cost standpoint, particularly where a large number of lines and machines are involved in a manufacturing operation, since it requires a relatively large investment in fault detecting equipment. Further, maintenance of the individual fault detecting units, and thus down time of the lines and machines, is excessive. With specific regard to the wire repair lines, it also is extremely difficult for a single operator to monitor and service a significant number of lines simultaneously. With regard to the wire insulating lines and the wire twisting machines, the operators frequently make errors in marking the faulty reels of wire at their respective work locations and the faulty wires become incorporated into a cable, thus making their repair exceedingly difficult. The system in which each of the wire insulating lines and wire twisting machines has its own individual fault detecting unit also does not readily lend itself to the collection of fault data for purposes such as statistical quality control studies or computerized process control.

Accordingly, an object of this invention is to provide new and improved apparatus for detecting faults in material.

Another object of this invention is to provide new and improved apparatus for detecting faults in material at separate work locations.

A further object of this invention is to provide new and improved apparatus for detecting faults in material, which is particularly adapted for monitoring a plurality of separate work locations simultaneously from a central location.

A still further object of this invention is to provide new and improved apparatus for detecting faults in material at separate work locations, which readily can be expanded for monitoring additional work locations.

Another object of this invention is to provide new and improved apparatus for detecting faults in the insulation of a plurality of electrical conductor wires at separate work locations, which is relatively inexpensive as compared to prior known apparatus for this purpose.

A further object of this invention is to provide new and improved apparatus for detecting faults in the insulation of electrical conductor wires at a plurality of separate work locations, which requires less maintenance than prior known apparatus for this purpose.

In accordance with the invention, apparatus for detecting faults in material includes at least two fault detecting circuits for detecting faults in respective associated portions of material, signal responsive means in each of the fault detecting circuits, and means in each of the fault detecting circuits operable upon the sensing of a fault to generate a signal which operates the signal responsive means in the fault detecting circuit. The fault detecting circuits are interconnected such that operating circuits for both of the fault sensing means are completed upon one of the fault sensing means sensing a fault, and thus the apparatus includes means in each of the fault detecting circuits responsive to the energization of the signal responsive means in that circuit, for precluding operation of the fault sensing means in the other fault detecting circuit in response to a fault in the material associated with the first fault detecting circuit.

In a preferred embodiment of the invention, apparatus for detecting faults in the insulation of at least two grounded electrical conductor wires as the wires are advanced longitudinally, includes a contact, a resistance and a capacitor connected in series between a single source of relatively high direct current voltage and each of several fault detecting means, one for each of the insulated electrical conductor wires. Each capacitor is charged from the voltage source through ground upon the closing of its respective contact, and energizes its respective fault detecting means upon being discharged. An electrode is positioned adjacent each of the insulated wires and is connected to the discharge side of a respective one of the capacitors so that a fault in the insulation of the wire coming adjacent the electrode completes a discharge path for each of the capacitors through the fault, whereby the one capacitor then discharges to energize its respective fault detecting means. The discharge path of the other of the capacitors, however, includes the contact which is in series with the first capacitor, and also includes a greater portion of the resistances than the discharge path of the first capacitor so that the discharge time constant of the second capacitor is greater than the discharge time constant of the first capacitor, and before the second capacitor can discharge to energize its respective fault detecting means the contact, and thus the second capacitor's discharge path, is opened by means responsive to the energization of the first fault detecting means.

This invention, together with further objects and advantages thereof, will best be understood by reference to the following detailed description taken in connection with the accompanying drawings, in which:

FIG. 1 is a schematic diagram of apparatus in accordance with the invention; and FIG. 2 is a detailed electrical circuit of a part of the apparatus shown in FIG. 1.

Referring to FIG. 1 of the drawings, it is seen that apparatus in accordance with the invention is illustrated in an inoperative condition in connection with a plurality of insulated electrical conductor wire repair lines 11. While three wire repair lines 11–1, 11–2 and 11–3 are shown in FIG. 1, the apparatus readily can be expanded to service additional lines, as desired, as subsequently will become apparent.

Each of the wire repair lines 11 includes a supply reel 12 from which an insulated electrical conductor wire 13 is advanced longitudinally and wound on a takeup reel 14. Each takeup reel 14 is driven by a motor 16 connectible to an A.C. source 17 in a suitable manner, such as by a first contact of a double throw switch 18, and a master control switch 19 for the apparatus. Each electrical conductor wire 13 is suitably grounded through its respective takeup reel 14, such as by direct attachment to a flange thereof, as illustrated in FIG. 1, the takeup reels being grounded in any suitable manner, not shown.

The illustrated embodiment of the invention includes a direct current high voltage power supply 21, such as ten kilovolts, and a direct current low voltage power supply 22, such as 240 volts, which are connectible to the A.C. voltage source 17 by the master control switch 19. A plurality of insulating fault detection stages 23 are provided, one for each of the wire repair lines 11, and each of the fault detection stages includes a high voltage fault locating or sensing circuit 24 and a low voltage fault detector 26 responsive to a signal from the fault sensing circuit. The fault locating or sensing circuits 24 are connected in parallel across the high voltage power supply 21 and the fault detectors 26 are connected in parallel across the low voltage power supply 22.

Each of the fault locating or sensing circuits 24 includes a capacitor 27, a resistance 28, and a suitable high voltage switch, such as an induction-type vacuum switch having an induction coil 29 and a contact 29C. The contact 29C and the resistance 28 are connected in series to the discharge side of the capacitor 27. Each induction coil 29 is connectible to a second direct current low voltage power supply 31, such as 24 volts, by a second contact of the respective one of the double throw switches 18, and the power supply 31 is connectible to the A.C. voltage source 17 by the master control switch 19.

Associated with the contact 29C of each of the induction coils 29 is a terminal 32, which is connected to the high voltage power supply 21, and a terminal 33, with which the contact is normally engaged and which is connected through a resistance 34 to the charge side of the contact's associated capacitor 27 to form a residual discharge path for the capacitor. The high voltage power supply 21 and the charge side of the capacitor 27 are connected to ground such that when the induction coil 29 is energized and moves the contact 29C into engagement with the terminal 32, the capacitor charges through ground and the capacitor's associated fault detector 26, as illustrated by the solid line arrows in FIG. 1.

Each of the fault locating or sensing circuits 24 includes a probe 36 having a plurality of electrodes between which the insulated wire 13 on the respective wire repair line 11 passes as the wire is being advanced longitudinally, the electrodes being connected by a high voltage lead 37 to the discharge side of the capacitor 27 of the fault locating circuit. Thus, when a fault in the insulation of the wire 13 comes adjacent the probe 36 the gas in the fault is ionized to produce an electrical discharge and the fault completes a discharge path for the capacitor 27, which then discharges, as illustrated in FIG. 1 by the dashed line arrows, through its respective fault detector 26, ground, the grounded wire 13, the fault, the probe 36 and the probe's high voltage lead 37.

More specifically, referring to FIG. 2, it is seen that the capacitor 27 discharges to generate a signal which feeds through an adjustable grid bias resistance 38 for a vacuum tube 39 of the fault detector 26, to change the grid bias on the tube so that it conducts. Conduction by the tube 39 energizes a relay 41 which closes a contact 41C–1 to lock operated; closes a contact 41C–2 to energize a signal light 42; closes a contact 41C–3 to energize a fault counter 43; opens a contact 41C–4 to de-energize its associated induction coil 29; and opens a contact 41C–5 in the power circuit of the takeup motor 16 for the wire repair line 11, to stop the motor. The induction coil 29, upon being de-energized, releases the contact 29C (FIG. 1) thereof from engagement with its terminal 32 to its normally engaged position with its terminal 33, whereby the high voltage power supply 21 is disconnected from the probe 36 so that an operator can work in the vicinity of the probe to repair the detected fault without danger of electrical shock, and whereby any residual charge remaining on the capacitor 27 discharges through the contact 29C and its associated resistances 28 and 34.

After the insulating fault has been repaired the operator presses a normally closed reset button 44 of the energized fault detector 26, to de-energize the relay 41 of the detector. The relay 41 then releases its locking contact 41C–1; releases its contact 41C–2 to de-energize the signal light 42; releases its contact 41C–3 in the energizing circuit of the fault counter 43; releases its contact 41C–4 so that the induction coil 29 is re-energized and moves the contact 29C thereof back into engagement with its terminal 32, whereby the capacitor 27 again becomes charged; and releases its contact 41C–5, whereby the takeup motor 16 for the de-energized wire repair line 11 again is operated to begin readvancement of the insulated wire 13.

A fault in the insulation of the wire 13 on one of the wire repair lines 11 coming adjacent the probe 36 of the respective fault locating or sensing circuit 24 also completes a discharge path for the capacitor 27 of each of the fault locating or sensing circuits associated with the other wire repair lines. For example, referring to FIG. 1 and assuming that a fault has been detected on the wire repair line 11–1, it is seen that the capacitor 27 of the fault locating or sensing circuit 24 for the wire repair line 11–2 tends to discharge through its associated fault detector 26 to ground, through the grounded wire 13 on the wire repair line 11–1, the fault, the probe 36 on the wire repair line 11–1, this probe's high voltage lead 37, the resistance 28 and the contact 29C of the fault locating circuit 24 for the wire repair line 11–1, and the contact 29C and the resistance 28 of its own fault locating or sensing circuit 24. Since the discharge path of this capacitor 27 includes both of the resistances 28, however, the discharge time constant of the capacitor is greater than the discharge time constant of the capacitor 27 of the fault locating or sensing circuit 24 for the wire repair line 11–1. Accordingly, before the capacitor 27 for the wire repair line 11–2 can discharge to energize its respective fault detector 26 the induction coil 29 associated with the wire repair line 11–1 has been de-energized to release its contact 29C, thereby opening the discharge path of the capacitor, whereby the wire repair line 11–2 continues to operate. In the same manner, the detection of the insulating fault on the wire repair line 11–1 will have no effect upon the wire repair line 11–3 or any additional wire repair lines being serviced by the apparatus.

Referring to FIG. 2, it is seen that the vacuum tube 39 of each of the fault detectors 26, in addition to being provided with its adjustable grid bias resistance 38, is provided with a grid stabilizing capacitor 46, an adjustable cathode bias resistance 47, and a resistance 48 connected between its cathode and the low voltage power supply 22, the adjustable resistance 47 and the resistance 48 forming a voltage divider for the purpose of maintaining a constant bias voltage on the cathode despite changes in current through the tube as the relay 41 of the detector is energized and de-energized, in a manner well known to those skilled in the art. A normally closed switch 49 is provided between the low voltage power supply 22 and the relay 41 for the purpose of turning off the relay 41 when its associated wire repair line 11 is not being used, and a diode 51, which functions as an arc suppressor for the switch 49 as it is opened and closed, is connected in parallel with the switch and the relay. The fault detector 26 also includes a normally open switch 52 which can be closed to complete an energizing circuit for the relay 41, for the purpose of adjusting the operating level of the fault detector circuit.

When it is desired to use one of the fault detection stages 23 for detecting and counting insulating faults on a wire insulating line or a wire pair twisting machine, the terminals of the contact 41C–5 of the relay 41 of the fault detection stage's fault detector 26 are interconnected by a jumper wire (not shown) so that the opening of the contact by the relay upon the detection of a fault does not de-energize the drive mechanism associated with the wire line or twisting machine, and the insulating line or twisting machine continues to operate. In addition, a normally closed switch 53 in the lock-in circuit of the relay 41 is moved to an open position so that the relay, upon being energized by the detection of a fault, does not lock operated, but instead is automatically de-energized upon its associated tube 39 ceasing to conduct. In this regard, the relay's associated diode 51, which, as noted hereinabove, serves as an arc suppressor for the switch 49, then also acts as an induction suppressor to shunt out the decay current of the relay, whereby the tube 39 is turned off quickly after the detection of a fault to return the fault detecting stage 23 to its normal operating condition for the detection and counting of the next succeeding fault. In other respects, the fault detecting stage 23 will operate in the same manner as described hereinabove with regard to its use on one of the wire repair lines 11.

To facilitate the monitoring and servicing of a plurality of the wire repair lines 11 by a single operator, the fault detecting stages 23, with the exception of the probes 36, may all be located at a central position, if so desired, with only the probes being located in the vicinity of their respective wire repair lines. Similarly, when the apparatus is being used to count insulating faults on wire insulating lines or wire pair twisting machines, this centralized arrangement is particularly desirable where data regarding the number of insulating faults on a plurality of the lines or machines is to be collected for processing by a computer, as for example in statistical quality control studies. In this regard, in addition to the collection of the fault data being facilitated, the entire handling of the data can be accomplished by trained technicians, or the data can be fed directly into the computer, thus eliminating the recording and handling of the data by relatively unskilled personnel at the work locations.

From the foregoing description, it is apparent that additional fault detecting stages 23 readily can be added to the apparatus for servicing additional wire repair lines 11, wire insulating lines or wire pair twisting machines. In this regard, it is contemplated that each of the fault detecting stages 23, or the fault locating circuit 24 and the fault detector 26 thereof, can be constructed as an individual circuit module with plug-in adaptors receivable in a suitably wired mounting board, in any well known manner. Further, it is apparent that by maintaining a reserve supply of these circuit modules, maintenance of the fault detecting apparatus can be facilitated, and down time of the wire repair lines 11, wire insulating lines or wire pair twisting machines, as the case may be, can be substantially reduced.

The capacitors 27 and the resistances 28 and 34 of the fault detecting stages 23 may be of any suitable values. By way of illustration, with the high voltage power supply 21 having a magnitude of ten kilovolts, as noted hereinabove, favorable results have been achieved with each capacitor 27 having a value of six hundredths (.06) of a microfarad, and each of the resistances 28 and 34 having a magnitude of two megohms and one megohm, respectively.

*Operation*

In operation, with the circuit of the apparatus arranged as shown in the drawings the master control switch 19 is closed to connect the takeup motors 16 and the power supplies 21, 22 and 31 to the A.C. source 17. This energizes the takeup motors 16, which then begin to rotate the takeup reels 14 to advance the insulated electrical conductor wires 13 longitudinally from the supply reels 12 between the electrodes of the probes 36. This also causes energization of the induction coils 29 in the fault locating or sensing circuits 24 of the fault detection stages 23 from the low voltage power supply 31 so that the coils move the contacts 29C into engagement with their terminals 32, whereby the capacitors 27 become charged from the high voltage power supply 21 through ground and the fault detectors 26 of the fault detection stages, as illustrated by the solid line arrows in FIG. 1.

When a fault in the insulation of one of the wires 13 comes adjacent the probe 36 of the fault locating circuit 24 of the wire's fault detection stage 23, the fault completes a discharge path for the capacitor 27 of the fault locating circuit. The capacitor 27 then discharges, as illustrated in FIG. 1 by the dashed line arrows, through the fault detector 26 of the fault detection stage 23, ground, the grounded wire 13, the fault, the probe 36 and the probe's high voltage lead 37.

Referring to FIG. 2, it is seen that the capacitor 27 discharges through the grid bias resistance 38 of the fault detector 26 to change the grid bias on its vacuum tube 39 so that the tube conducts to cause energization of its associated relay 41. The energized relay 41 closes its contact 41C–1 to lock operated; closes its contact 41C–2 to energize its associated signal light 42; closes its contact 41C–3 to energize its associated fault counter 43; opens its contact 41C–4 to de-energize its associated induction coil 29; and opens its contact 41C–5 in the power circuit of the takeup motor 16 for the wire repair line 11, to stop the motor. The induction coil 29, upon being de-energized, releases the contact 29C (FIG. 1) thereof from engagement with its terminal 32 to its normally engaged position with its terminal 33, whereby the high voltage power supply 21 is disconnected from the probe 36 so that an operator can work in the vicinity of the probe to repair the detected fault without danger of electrical shock, and whereby any residual charge remaining on the capacitor discharges through the contact 29C and its associated resistances 28 and 34.

The fault in the insulation of the wire 13 on one of the wire repair lines 11 also completes a discharge path for each of the capacitors 27 of the fault detection stages 23 on the other wire repair lines, through the grid bias resistance 38 of the capacitor's associated vacuum tube 39, ground, the grounded wire 13, the fault, the probe 36 of the energized fault detection stage 23, the probe's high voltage lead 37, the resistance 28 and the contact 29C of the energized fault detection stage, and the resistance 28 and the contact 29C of the capacitor's own fault detection stage. However, since the discharge path of each of these other capacitors 27 includes both of the resistances 28, while the discharge path of the capacitor of the energized fault detection stage 23 does not include these resistances, the discharge time constant of each of the other capacitors is greater than that of the capacitor of the energized fault detection stage and the induction coil 29 of this stage will have opened its contact 29C to open the discharge path of each of the capacitors on the other wire lines before they can discharge to energize their respective fault detectors 26, and thus the other wire lines will be unaffected by the detection of the fault on the one wire line and will continue to operate.

After the detected insulating fault has been repaired the operator presses the normally closed reset button 44 (FIG. 2) of the energized fault detection stage 23, to de-energize its relay 41. The relay 41 then releases its lock-in contact 41C–1; releases its contact 41C–2 to de-energize its associated signal light 42; releases its contact 41C–3 in the energizing circuit of its associated fault counter 43; releases its contact 41C–4 so that its associated induction coil 29 is re-energized and moves the contact 29C thereof into engagement with its terminal 32, whereby the capacitor 27 of the fault detection stage 23 again becomes charged; and releases its contact 41C–5, whereby the takeup motor 16 for the de-energized wire repair line 11 again is operated to begin readvancement of the insulated wire 13.

When it is desired to use one of the fault detection stages 23 for detecting and counting insulating faults on a wire insulating line or a wire pair twisting machine, the terminals of the contact 41C–5 of the relay 41 of the fault detection stage are interconnected by the above-mentioned jumper wire (not shown) so that the opening of the contact by the relay upon the detection of a fault does not de-energize the drive mechanism associated with the wire line or twisting machine, and the insulating line or twisting machine continues to operate. The switch 53 in the lock-in circuit of the relay 41 also is opened so that the relay, upon being energized by the detection of a fault, does not lock operated, but instead is automatically de-energized upon its associated tube 39 ceasing to conduct. In this regard, the diode 51 associated with the relay 41 acts to shunt out the decay current of the relay, whereby the tube 39 is turned off quickly after the detection of a fault to return the fault detection stage 23 to its normal operating condition for the detection and counting of the next succeeding fault. In other respects, the fault detection stage 23 will operate in the same manner as described hereinabove with regard to its use on one of the wire repair lines 11.

When it is desired that one of the wire repair lines 11 be inoperative while the other wire repair lines are operative, the double throw switch 18 in the power circuits of the takeup motor 16 and the induction coil 29 for the wire repair line, and the switch 49 in the fault detector 26 associated with the wire repair line, are moved to their open positions.

While one embodiment of the invention has been disclosed, many modifications will be apparent and it is intended that the invention be interpreted as including all modifications which fall within the true spirit and scope of the invention.

What is claimed is:

1. Apparatus for detecting faults in electrically nonconducting material, which comprises:
    at least two fault detecting circuits for detecting faults in respective associated portions of material;
    signal responsive means in each of said fault detecting circuits;
    means connected to said signal responsive means in each of said fault detecting circuits for sensing a fault in the portion of material associated with said fault detecting circuit and operable upon the sensing of a fault to generate a signal which operates said signal responsive means in said fault detecting circuit, said fault detecting circuits being interconnected such that separate operating circuits for both of said fault sensing means are completed upon one of said fault sensing means sensing a fault, the operating circuits being such that said one fault sensing means has an operating response time which is faster than the operating response time of the other of said fault sensing means whereby said one fault sensing means operates before said other fault sensing means can operate; and
    means in each of said fault detecting circuits responsive to the energization of said signal responsive means in said fault detecting circuit by its associated fault sensing means, for rendering the operating circuit of said fault sensing means in the other of said fault detecting circuits inoperative and thereby precluding operation of said fault sensing means in said other fault detecting circuit in response to a fault in the portion of material associated with said first mentioned fault detecting circuit.

2. Apparatus for detecting faults in electrically nonconducting material, as recited in claim 1, which further comprises:
    separate means for advancing the portions of material associated with each of said fault detecting circuits independently of one another, said signal responsive means of each of said fault detecting circuits rendering its respective material advancing means inoperative upon said signal responsive means being energized by its associated fault sensing means.

3. Apparatus for detecting faults in electrically nonconducting material, as recited in claim 1, which further comprises:
- a single source of relatively high electrical potential; and
- a capacitor-resistance network in each of said fault sensing means, said capacitor-resistance networks being connected to respective ones of said signal responsive means and being connected in parallel across said single source of relatively high electrical potential.

4. Apparatus for detecting faults in electrically nonconducting material, which comprises:
- at least two separate fault detectors;
- a source of electrical potential;
- capacitors each connected to said source of electrical potential and a respective one of said fault detectors so as to be charged from said source of electrical potential and so as to energize said fault detector upon being discharged;
- resistance means;
- electrical probes associated with respective portions of material and with the opposite sides of respective ones of said capacitors such that a fault in the material adjacent one of said probes completes a discharge path for each of said capacitors through the fault, whereby the one of said capacitors which is associated with said probe discharges to energize the respective one of said fault detectors, the discharge path completed for the other of said capacitors including a greater portion of said resistance means than the discharge path of said one capacitor so that the discharge time constant of said other capacitor is longer than the discharge time constant of said one capacitor; and
- means responsive to the energization of the one of said fault detectors, for opening the discharge path of said other capacitor before said other capacitor can discharge to energize its respective fault detector.

5. Apparatus for detecting faults in electrically nonconducting material, as recited in claim 4, in which said resistance means includes separate resistances in series with respective ones of said capacitors.

6. Apparatus for detecting faults in electrically nonconducting material, as recited in claim 4, which further comprises:
- separate means for advancing the portions of material independently of one another, said one fault detector rendering a respective one of said material advancing means inoperative upon being energized by said one capacitor, and said means for opening the discharge path of said other capacitor also disconnecting said source of electrical potential from said one capacitor and the one of said probes which is adjacent the fault.

7. Apparatus for detecting faults in electrically nonconducting material, as recited in claim 6, in which said means for opening the discharge path of said other capacitor includes a contact in series with said one capacitor, said one capacitor being charged from said source of electrical potential upon said contact being closed, and said contact being opened in response to the energization of said one fault detector by the discharge of said one capacitor to open the discharge path of said other capacitor and to disconnect said source of electrical potential from said one capacitor and the one of said probes which is adjacent the fault.

8. Apparatus for detecting faults in electrically nonconducting material, as recited in claim 7, which further comprises:
- first and second terminals selectively engageable by said contact, said contact normally being engaged with said first terminal;
- means connecting said source of electrical potential to said second terminal and connecting said contact to the discharge side of said one capacitor;
- means connecting the charge side of said one capacitor to said first terminal; and
- means for moving said contact into engagement with said second terminal to complete a charging circuit for said one capacitor so that said capacitor becomes charged, said contact moving means being de-energized by said one fault detector upon said fault detector being energized by discharge of said capacitor, whereby said contact moving means releases said contact into engagement with said first terminal to complete the discharge of said one capacitor.

9. Apparatus for detecting faults in at least two separate pieces of electrically nonconducting material, which comprises:
- separate fault detectors for each of the pieces of electrically nonconducting material;
- a source of electrical potential;
- resistance means and a capacitor connected in series between said source of electrical potential and each of said fault detectors, said capacitor being charged from said source of electrical potential and said fault detector being energized by discharge of said capacitor;
- electrical probes for each of the pieces of electrically nonconducting material, each of said probes being associated with the opposite sides of a respective one of said capacitors such that a fault in one of the pieces of electrically nonconducting material adjacent its respective one of said probes completes a discharge path for each of said capacitors through the fault, whereby the one of said capacitors which is associated with said probe discharges to energize the respective one of said fault detectors, the discharge path completed for the other of said capacitors including a greater portion of said resistance means than the discharge path of said one capacitor so that the discharge time constant of said other capacitor is longer than the discharge time constant of said one capacitor; and
- means responsive to the energization of the one of said fault detectors, for opening the discharge path of said other capacitor before said other capacitor can discharge to energize its respective fault detector.

10. Apparatus for detecting faults in the insulation of at least two grounded electrical conductor wires as the wires are advanced longitudinally, which comprises:
- separate fault detectors for each of the insulated electrical conductor wires;
- a single source of relatively high direct current voltage;
- a contact, a resistance and a capacitor connected in series between said voltage source and each of said fault detectors, the charge side of said capacitor being connected through said fault detector to ground and said voltage source being connected to ground in a manner such that said capacitor is charged from said voltage source through ground upon the closing of said contact and such that said fault detector is energized by discharge of said capacitor;
- means for closing said contacts so that said capacitors become charged;
- an electrode positioned adjacent each of the insulated, grounded electrical conductor wires and connected to the discharge side of a respective one of said capacitors so that a fault in the insulation of the wire coming adjacent said electrode completes a discharge path for each of said capacitors through the fault, whereby said one capacitor discharges to energize the respective one of said fault detectors; the discharge path completed for the other of said capacitors including said contact which is in series with said one capacitor and including a greater portion of said resistances than the discharge path of said one capacitor whereby the discharge time constant of said other capacitor is greater than the discharge time constant of said one capacitor; and means responsive to the energization of the one of said fault detectors, for opening said contact which is in series with said one capacitor to open the discharge path of said other capacitor before said other capacitor can discharge to energize its respective fault detector.

References Cited

UNITED STATES PATENTS

| | | | |
|---|---|---|---|
| 2,478,414 | 8/1949 | Michal | 324—54 |
| 2,532,336 | 12/1950 | Rufolo | 324—54 |
| 2,994,820 | 8/1961 | Brown | 324—54 |
| 3,323,701 | 6/1967 | Gurski et al. | 324—54 XR |

RUDOLPH V. ROLINEC, *Primary Examiner.*

G. R. STRECKER, *Assistant Examiner.*